United States Patent
Euse

(10) Patent No.: US 8,191,510 B2
(45) Date of Patent: Jun. 5, 2012

(54) BIRD CAGE ASSEMBLY WITH CLEANING SINKS

(76) Inventor: Peter F. Euse, Bonita Springs, FL (US)

( * ) Notice: Subject to any disclaimer, the term of this patent is extended or adjusted under 35 U.S.C. 154(b) by 99 days.

(21) Appl. No.: 12/777,361

(22) Filed: May 11, 2010

(65) Prior Publication Data

US 2011/0277694 A1    Nov. 17, 2011

(51) Int. Cl.
*A01K 31/06* (2006.01)
(52) U.S. Cl. ......................... 119/467; 119/462
(58) Field of Classification Search .................. 119/462, 119/459, 460, 479, 527, 432, 458, 467–470, 119/461; 4/597
See application file for complete search history.

(56) References Cited

U.S. PATENT DOCUMENTS

| | | | | |
|---|---|---|---|---|
| 689,164 A * | 12/1901 | Castle | | 4/599 |
| 1,468,730 A | 9/1923 | Oster | | |
| 1,502,748 A | 7/1924 | Schleich | | |
| 1,692,835 A | 11/1928 | Hendryx | | |
| 1,771,491 A | 7/1930 | Hendryx | | |
| 1,864,230 A | 6/1932 | Busch | | |
| 1,929,584 A | 10/1933 | Havlis | | |
| 2,524,229 A * | 10/1950 | Krueger | | 119/479 |
| 2,747,545 A | 5/1956 | Baldwin | | |
| 3,293,664 A * | 12/1966 | Coons | | 4/599 |
| 3,657,746 A * | 4/1972 | Downey | | 4/599 |
| 4,181,612 A | 1/1980 | Trail | | |
| 4,285,301 A | 8/1981 | Voss | | |
| 4,572,107 A * | 2/1986 | Clarizo | | 119/463 |
| 4,586,463 A | 5/1986 | Braeuner | | |
| 4,838,204 A * | 6/1989 | Young | | 119/471 |
| 5,009,197 A | 4/1991 | Cottell | | |
| 5,435,266 A | 7/1995 | Carson | | |
| 5,553,568 A | 9/1996 | Verschuere et al. | | |
| 5,996,536 A * | 12/1999 | King | | 119/459 |
| 6,532,900 B1 * | 3/2003 | Wang | | 119/479 |
| 6,626,129 B2 * | 9/2003 | Schrader | | 119/479 |
| D495,098 S | 8/2004 | Gallardo | | |
| 6,811,164 B2 * | 11/2004 | Trogstam | | 280/79.3 |
| D641,455 S * | 7/2011 | Euse | | D23/284 |
| 2009/0114164 A1 * | 5/2009 | Liu | | 119/475 |

FOREIGN PATENT DOCUMENTS

DE    19747311    9/2002
(Continued)

*Primary Examiner* — Kristen C Hayes
(74) *Attorney, Agent, or Firm* — Edward M. Livingston, Esq.; Bryan L. Loeffler, Esq.; The Livingston Firm

(57) ABSTRACT

A bird cage assembly with cleaning sinks that allows a user to clean a bird cage (1) without having to move the bird cage or dirtying the area around the bird cage. The bird cage rests in a lower cleaning sink (2) having a perimeter wall (4) extending upward from a floor (5) that angles downward towards a drain (6) having a drain pipe (7) extending from the drain. A flange (8) extends outward at an upward angle from an upper edge (9) of the perimeter wall and acts as a gutter to catch debris and water used to clean the bird cage. An upper cleaning sink (17) may be attached to the top of the bird cage to collect debris and water from a perch (18) located above the upper cleaning sink. The upper cleaning sink comprises a perimeter wall extending upward from a floor that angles downward towards a drain having a drain pipe extending downward from the drain. The drain pipe empties into the lower cleaning sink. A removable curtain (26) may be closed around the bird cage, thereby enclosing the entire birdcage to prevent any water from getting on surrounding areas while cleaning the bird cage.

1 Claim, 3 Drawing Sheets

FOREIGN PATENT DOCUMENTS

| | | |
|---|---|---|
| FR | 2766330 | 1/1999 |
| GB | 2079576 | 1/1982 |
| JP | 4135431 | 5/1992 |
| JP | 2003230327 | 8/2003 |
| KR | 20050011637 | 1/2005 |

* cited by examiner

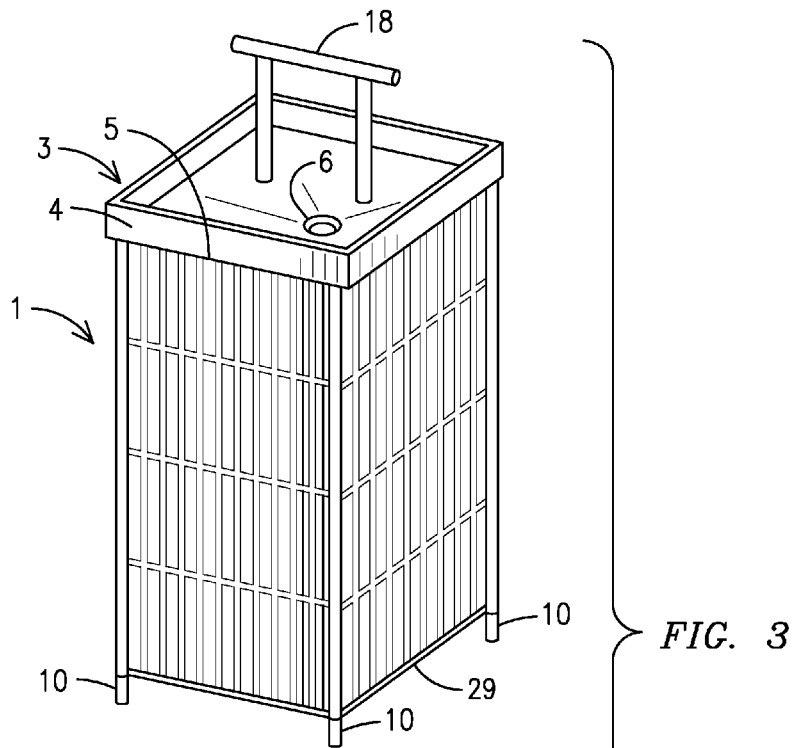
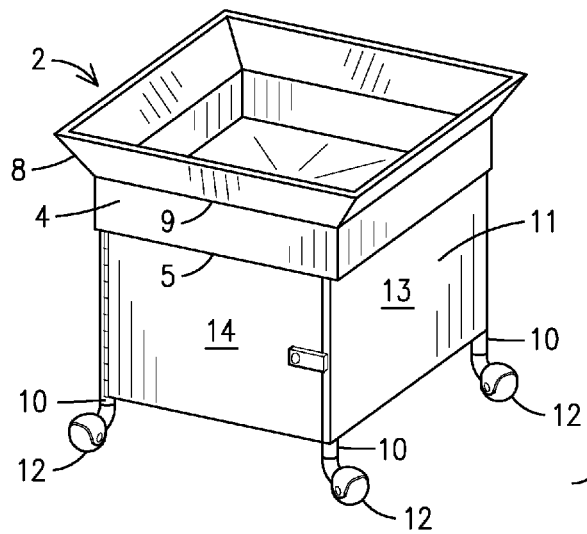
FIG. 3
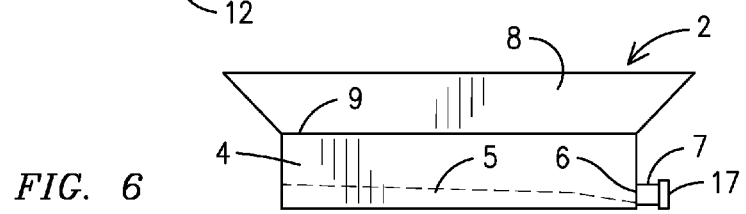
FIG. 6

BIRD CAGE ASSEMBLY WITH CLEANING SINKS

BACKGROUND OF THE INVENTION

This invention relates to bird cages, more particularly, a bird cage assembly with cleaning sinks that may an integrated part of a new bird cage or added to an existing bird cage for the purpose of collecting and disposing of waste, such as bird food and feces, and water used for cleaning the bird cage.

A well known problem with owning and caring for domesticated birds is the maintenance of bird cages. Most birds are typically messy when eating and have a tendency to drop food and other matter, including feces, on the bottom of the bird cage, on top of the bird cage while on a perch and even outside of the bird cage onto the floor surrounding the bird cage. This creates quite a mess on the bars of the bird cage and especially in the bottom of the bird cage where waste accumulates and must be cleaned on a regular basis. Bird owners typically place absorbent material, such as newspaper, wood shavings or corn cob in the bottom portion of the bird cage to collect feces and water spilled from the bird's water dish. However, the absorbent material must be replaced on a regular basis and the bird cages must also be sprayed down and washed on a regular basis. Bird cages cannot be sprayed down inside and typically need to be taken outside and to be washed down with a hose. This poses a problem for bird owners who live in condos or apartments and cannot take the bird cages outside for cleaning. This also poses a problem for bird owners who own large cages that are difficult to move.

Thus, a need exists for a bird cage assembly with cleaning sinks that allows a user to easily clean the bird cage on a daily basis by washing out the cleaning sinks with small amounts of water or to easily wash the entire bird cage without having to move the bird cage outside. In addition, a need exists for a bird cage assembly with cleaning sinks that keeps the area around the bird cage clean and allows a user to spray the bird cage down with water without getting water on the area surrounding the bird cage.

The relevant prior art includes the following references:

| Patent No. (U.S. unless stated otherwise) | Inventor | Issue/Publication Date |
| --- | --- | --- |
| KR20050011637 | Young | Jan. 29, 2005 |
| D495,098 | Gallardo | Aug. 24, 2004 |
| JP2003230327 | Miwako | Aug. 19, 2003 |
| DE19747311 | Hartmut | Sep. 05, 2002 |
| FR2766330 | Herve | Jan. 29, 1999 |
| 5,553,568 | Verscheure et al. | Sep. 10, 1996 |
| 5,435,266 | Carson | Jul. 25, 1995 |
| JP4135431 | Takuji | May 08, 1992 |
| 5,009,197 | Cottell | Apr. 23, 1991 |
| 4,586,463 | Braeuner | May 06, 1986 |
| GB2079576 | Ayres | Jan. 27, 1982 |
| 4,285,301 | Voss | Aug. 25, 1981 |
| 4,181,612 | Trail | Jan. 01, 1980 |
| 2,747,545 | Baldwin | May 29, 1956 |
| 1,864,230 | Busch | Jun. 21, 1932 |
| 1,929,584 | Havlis | Oct. 10, 1933 |
| 1,771,491 | Hendryx | Jul. 29, 1930 |
| 1,692,835 | Hendryx | Nov. 27, 1928 |
| 1,502,748 | Schleich | Jul. 29, 1924 |
| 1,468,730 | Oster | Sep. 25, 1923 |

SUMMARY OF THE INVENTION

The primary objects of the present invention are to provide a bird cage assembly with cleaning sinks that allows a user to easily clean the bird cage on a daily basis by washing out the cleaning sinks with small amounts of water from a squirt bottle or other water source.

Another object of the present invention is to provide a bird cage assembly with cleaning sinks that allows a user to wash the entire bird cage without having to move the bird cage.

An even further object of the present invention is to provide a bird cage assembly with cleaning sinks that keeps the area around the bird cage clean.

Another object of the present invention is to provide a bird cage assembly with cleaning sinks that allows a user to spray down the bird cage down with water without getting water the area surrounding the bird cage The present invention fulfills the above and other objects by providing a bird cage assembly with cleaning sinks that may be an integral part of a new bird cage or retrofitted to an existing bird cage. The bird cage rests in a lower cleaning sink having a perimeter wall extending upward from a floor that angles downward towards a drain having a drain pipe extending from the drain. A flange extends outward at an upward angle from an upper edge of the perimeter wall and acts as a gutter to catch debris and water used to clean the bird cage. Spacing means, such as legs extending downward from the bird cage, spacers, etc., keeps the bird cage spaced a predetermined distance from the floor of the lower cleaning sink while the bird cage is resting in the lower cleaning sink. When the bird cage is resting in the lower cleaning sink, the bottom of the bird cage is preferably spaced at a distance from the floor of the lower cleaning sink that allows a space between the bottom of the bird cage and the upper edge of the perimeter wall for water and other debris collected by the flange to pass through.

Legs extend downward from the lower cleaning sink creating a base. Casters may be located on the legs to allow a user to roll the lower cleaning sink and the bird cage to an area for cleaning, such as a kitchen or a bathroom. A basin may be placed underneath the drain pipe of the lower cleaning sink to collect debris and water. Alternatively, the drain pipe may be connected to the plumbing of the house, or a user may roll the lower cleaning sink over a toilet when cleaning the bird cage. A sprayer, which may be attached to a faucet, connected to the plumbing of a house and/or connected to another water source, is used for spraying the bird cage and cleaning sinks with water. The base also provides a storage area for the sprayer, basin, cleaning accessories, bird cage accessories, bird food and so forth.

In addition to the lower cleaning sink, an upper cleaning sink may be attached to the top of the bird cage to collect debris and water from a perch located above the upper cleaning sink. The upper cleaning sink comprises a perimeter wall extending upward from a floor that slopes toward a drain having a drain pipe extending downward from the drain. The drain pipe empties into the lower cleaning sink.

An extension pole having a bottom end, a top end and a loop attached to the top end is removably attachable to the upper cleaning sink via an attachment means, such as a ring located on the perimeter wall of the upper cleaning sink. The height of the extension pole may be adjusted and locked in place using a screw located on the ring. A curtain is removably attached to the loop. The curtain may be closed around the bird cage, thereby enclosing the entire birdcage to prevent any water from getting on surrounding areas while cleaning the bird cage. The bottom of the curtain rests in the flange of the lower cleaning sink, thereby allowing any water to run down the inside of the curtain into the lower cleaning sink while the bird cage is being cleaned.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is an exploded side view of a bird cage assembly with upper and lower cleaning sinks of the present invention attached to a bird cage;

FIG. 4 is a top perspective side view of a lower cleaning sink of a bird cage assembly of the present invention;

FIG. 6 is a side plan view of a lower cleaning sink 2 of a bird cage assembly of the present invention is shown having no base.

DESCRIPTION OF THE PREFERRED EMBODIMENTS

Figures 1, 5:
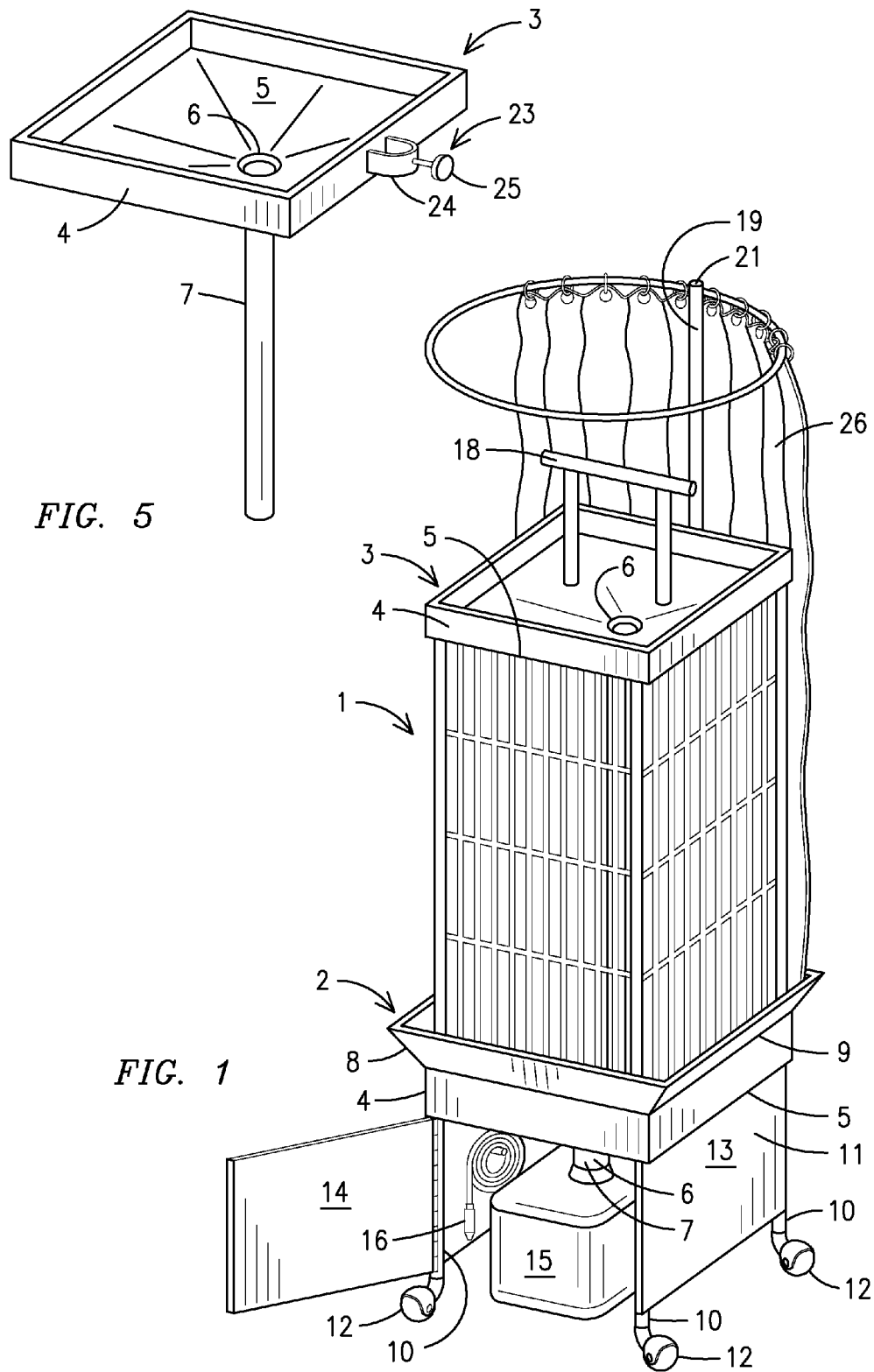
FIG. 1 is a side perspective view of a bird cage assembly with upper and lower cleaning sinks of the present invention attached to a bird cage.
FIG. 5 is a perspective side view of an upper cleaning sink of a bird cage assembly of the present invention.

For purposes of describing the preferred embodiment, the terminology used in reference to the numbered components in the drawings is as follows:

| | | |
|---|---|---|
| 1. | | bird cage |
| 2. | | lower cleaning sink |
| 3. | | upper cleaning sink |
| 4. | | perimeter wall |
| 5. | | floor |
| 6. | | drain |
| 7. | | drain pipe |
| 8. | | flange |
| 9. | | upper edge |
| 10. | | leg |
| 11. | | base |
| 12. | | caster |
| 13. | | wall |
| 14. | | door |
| 15. | | basin |
| 16. | | sprayer |
| 17. | | cap |
| 18. | | perch |
| 19. | | extension pole |
| 20. | | bottom end |
| 21. | | top end |
| 22. | | loop |
| 23. | | attachment means |
| 24. | | ring |
| 25. | | screw |
| 26. | | curtain |
| 27. | | spacing means |
| 28. | | spacer |
| 29. | | bottom of bird cage |

Figure 2:
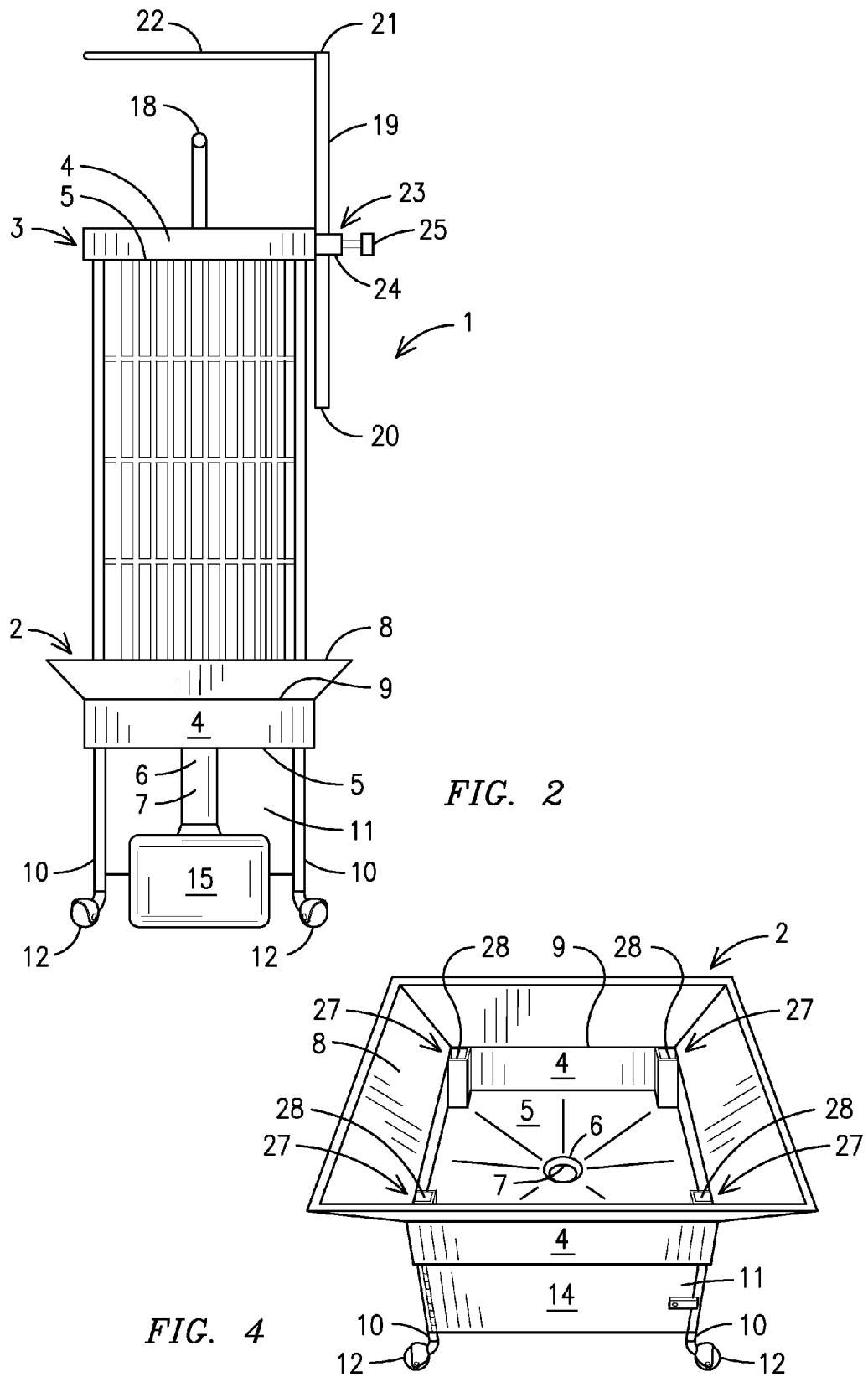
FIG. 2 is a side view of a bird cage assembly with upper and lower cleaning sinks of the present invention attached to a bird cage.

With reference to FIGS. 1-3, a bird cage assembly with upper and lower cleaning sinks 2, 3 of the present invention attached to a bird cage is shown. The bird cage 1 rests in a lower cleaning sink 2 having a perimeter wall 4 extending upward from a floor 5 that angles downward towards a drain 6 (as shown in FIG. 4) having a drain pipe 7 extending from the drain 6. A flange 8 extends outward at an upward angle from an upper edge 9 of the perimeter wall 4 of the lower cleaning sink 2. The flange 8 acts as a gutter to catch debris and water used to clean the bird cage 1 and the lower cleaning sink 2. The upward angle of the flange 8 directs the flow of debris and water into the lower cleaning sink 2. Spacing means 27, such as legs 10 extending downward from the bird cage 1, spacers 28 (as shown in FIG. 4), etc., keeps the bird cage 1 spaced a predetermined distance from the floor 5 of the lower cleaning sink 2 while the bird cage 1 is resting in the lower cleaning sink 2. When the bird cage 1 is resting in the lower cleaning sink 2, the bottom 28 of the bird cage 1 is preferably spaced at a distance from the floor 5 of the lower cleaning sink 2 that allows a space between the bottom 29 of the bird cage 1 and the upper edge 9 of the perimeter wall 4 for water and other debris collected by the flange 8 to pass through. Legs 10 extend downward from the lower cleaning sink 2 creating a base 11. Casters 12 may be located on the legs 10 to allow a user to roll the lower cleaning sink 2 and the bird cage 1 to an area for cleaning, such as a kitchen or a bathroom. The base 11 of the lower cleaning sink 2 may be enclosed by walls 13 located in-between the legs 10. A door 14 allows access to the base 11 and the drain pipe 7. A basin 15 may be placed underneath the drain pipe 7 to collect debris and water. Alternatively, the drain pipe 7 may be connected to the plumbing of the house, or a user may roll the lower cleaning sink 2 over a toilet when cleaning the bird cage 1. A sprayer 16, which may be attached to a faucet, connected to the plumbing of a house and/or connected to another water source, is used for spraying the bird cage 1 and cleaning sinks 2, 3 with water. The base 11 also provides a storage area for the sprayer 16, basin 15, cleaning accessories, bird cage accessories, bird food and so forth. An upper cleaning sink 3 is located on top of the bird cage 1 collects debris and water from a perch 18 located above the upper cleaning sink 17. The upper cleaning sink 3 comprises a perimeter wall 4 extending upward from a floor 5 that angles downward towards a drain 6 (as shown in FIG. 7) having a drain pipe 7 extending downward from the drain 6. The drain pipe 7 empties into the lower cleaning sink 2. An extension pole 19 having a bottom end 20, a top end 21 and a loop 22 attached to the top end 21 is removably attachable to the upper cleaning sink 3 via an attachment means 23, such as a ring 24 located on the perimeter wall 4 of the upper cleaning sink 3. The height of the extension pole 19 may be adjusted and locked in place using a screw 25 located on the ring 24. A curtain 26 is removably attached to the loop 22. The curtain 26 may be closed around the bird cage 1, thereby enclosing the entire birdcage 1 to prevent any water from getting on surrounding areas while cleaning the bird cage 1. The bottom of the curtain 26 rests in the flange 8 of the lower cleaning sink 2, thereby allowing any water to run down the inside of the curtain 26 into the lower cleaning sink 2.

With reference to FIG. 4, a top perspective side view of a lower cleaning sink 2 of a bird cage assembly of the present invention is shown. The lower cleaning sink 2 comprises a perimeter wall 4 extending upward from a floor 5 that angles towards a drain 6 having a drain pipe 7 extending from the drain 6. A flange 8 extends outward at an upward angle from an upper edge 9 of the perimeter wall 4 of the lower cleaning sink 2. Legs 10 extend downward from the lower cleaning sink 3 creating a base 11. Casters 12 may be located on the legs 10 to allow a user to roll the base 2 and the bird cage 1 to an area for cleaning, such as a kitchen or a bathroom. A door 14 allows access to the base 11 and the drain pipe 7. Spacing means 27, such as spacers 28, keeps a bird cage 1 spaced a predetermined distance from the floor 5 of the lower cleaning sink 2 while the bird cage 1 is resting in the base 2.

With reference to FIG. 5, a perspective side view of an upper cleaning sink 3 of a bird cage assembly of the present invention is shown. The upper cleaning sink 3 comprises a perimeter wall 4 extending upward from a floor 5 that angles downward towards a drain 6 (as shown in FIG. 7) having a drain pipe 7 extending downward from the drain 6. An attachment means 23, such as a ring 24 located on the perimeter wall 4, allows a user to attach an extension pole 19 to the upper cleaning sink 3 for holding a shower curtain 26 (as shown in FIGS. 1 and 2). The height of the extension pole 19 may be adjusted and locked in place using a screw 25 located on the ring 24.

Finally with reference to FIG. 6, a side plan view of a lower cleaning sink 2 of a bird cage assembly of the present invention is shown having no base 11 is shown. The lower cleaning sink 2 comprises a perimeter wall 4 extending upward from a floor 5 that angles downward towards a drain 6 having a drain pipe 7 extending downward from the drain 6. A cap 17 allows a user to seal the drain pipe 7. A flange 8 extends outward at an upward angle from an upper edge 9 of the perimeter wall 4 of the lower cleaning sink 2.

It is to be understood that while a preferred embodiment of the invention is illustrated, it is not to be limited to the specific form or arrangement of parts herein described and shown. Although the embodiment shown here has a square shape, then invention may be any shape, such as circular, hexagonal, etc., to be adapted to any shape of bird cage. It will be apparent to those skilled in the art that various changes may be made without departing from the scope of the invention and the invention is not be considered limited to what is shown and described in the specification and drawings.

Having thus described my invention, I claim:

1. A bird cage cleaning assembly for bird cages comprising:
    a bird cage;
    a lower cleaning sink attached to the bird cage, said lower cleaning sink having a perimeter wall extending upward from a floor that angles downward towards a drain;
    an extension pole having a bottom end and a top end that is attachable to an upper cleaning sink by an integral attachment means;
    a loop extending from the top end of the extension pole; and
    a curtain attached to the loop.

* * * * *